Mar. 6, 1923.
E. J. DE NORMANVILLE.
TRANSMISSION GEAR OF MOTOR ROAD VEHICLES.
FILED AUG. 12, 1920.
1,447,837.
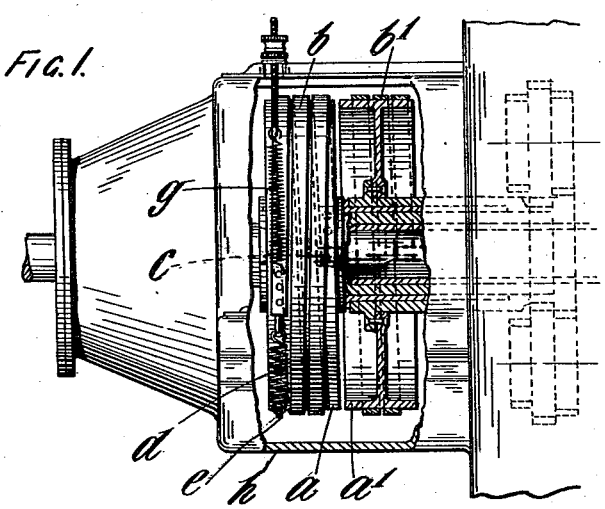
*Fig. 1.*
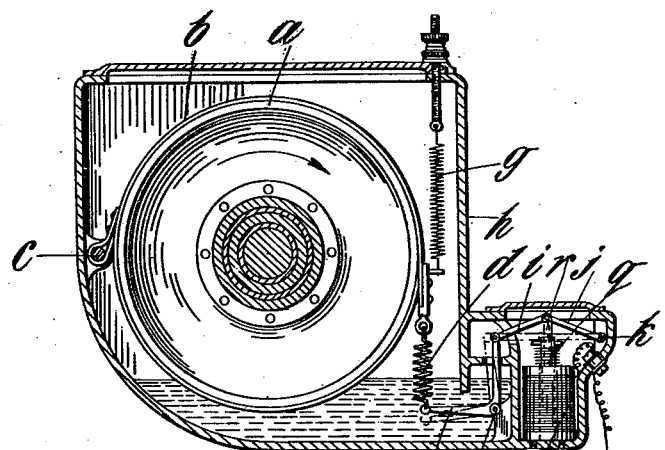
*Fig. 2.*
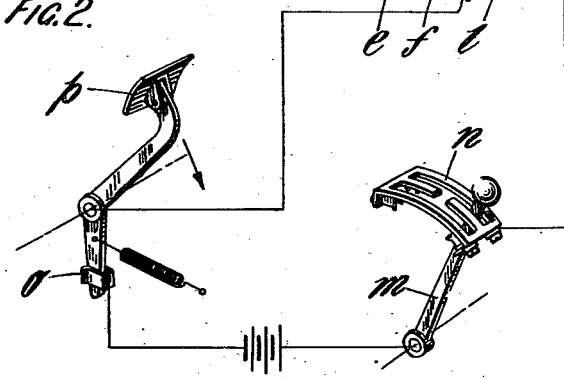
INVENTOR
Edgar Joseph de Normanville Patented Mar. 6, 1923.

1,447,837

UNITED STATES PATENT OFFICE.

EDGAR JOSEPH DE NORMANVILLE, OF LONDON, ENGLAND.

TRANSMISSION GEAR OF MOTOR ROAD VEHICLES.

Application filed August 12, 1920. Serial No. 403,007.

*To all whom it may concern:*

Be it known that I, EDGAR JOSEPH DE NORMANVILLE, a subject of the King of Great Britain, residing at London, England, have invented new and useful Improvements relating to Transmission Gears of Motor Road Vehicles, of which the following is a specification.

This invention relates to the transmission gear of motor road vehicles and particularly to vehicles provided with epicyclic gears of the brake controlled type, and the said invention provides a novel form of brake apparatus for changing the speeds and a novel method of controlling the application and release of the brakes.

According to my invention, the several brake drums are provided with brake bands which in the preferred form are wound spirally round the drums and embrace more than one complete turn, one end of each brake band being anchored, and the free end being connected, preferably through a spring, to the means for applying the brake. Retracting springs are provided to release the brake bands and draw them clear of the brake drums when the actuating means are inoperative. The direction of winding of each brake band is such that frictional contact of the band and drum tends to apply the brake.

Brake bands thus constructed can be put into operation with a minimum effort.

I prefer to apply the brakes initially to start the braking action by electro-magnetic means controlled by a small lever on the steering wheel or column for making and breaking the electric circuits, but if desired the brake band may be moved to the operative position by mechanical means, the arrangement being such that when once moved to the operative position the brake band will be maintained in this position without further or continued effort on the part of the operator.

In the accompanying drawing:—

Figure 1 is a side view of a portion of a variable speed transmission gear having this invention applied thereto, with parts in section.

Figure 2 is an end view showing one of the brake drums and the appurtenant brake band and band operating devices.

As shown in this drawing, brake drums $a, a'$ are provided with brake band $b, b'$, respectively, each of which is lapped more than one complete turn round the corresponding drum. One end of each band is secured to the casing as at $c$ and the opposite end of the band is connected through a spring $d$ to one arm of a bell crank lever $e$ pivoted at $f$. By moving the lever $e$ to the position indicated in broken lines in Figure 2 the band $b$ is brought into frictional contact with the drum $a$ and can be maintained in this operative position by a very small force owing to the manner in which the band is mounted with reference to the direction of rotation of the drum, so that the grip of the band on the drum is maintained or increased as soon as these parts are brought into sufficient frictional contact.

A retracting spring $g$ is provided to release the band $b$ and draw it clear of the drum $a$ when the lever $e$ is returned to the position shown in full lines in Figure 2.

If preferred the springs $d$ and $g$ may be arranged to operate in compression instead of in tension.

The whole of the variable velocity ratio gear including the brake drums and bands is enclosed in a casing $h$ containing oil so that the surfaces are continuously lubricated and further the gear casing is preferably built up as part of the engine casing.

The lever $e$ can be conveniently moved by an arm $i$ pivoted to an arm $j$ which in turn is mounted on a fixed pivot $k$, the arms $i$, $j$ forming a toggle for which purpose they are arranged so that the joint connecting them together is carried a little below the line of alignment of these arms when the lever $e$ is in the position shown in broken lines. The lever $e$ is thereby held in this position against the pull of the spring $g$.

With this arrangement the brake is applied by movement of a member connected to the arms $i, j$, at the connecting joint. Each brake band in the gear is operated separately by a similar device corresponding thereto.

In the arrangement shown in Figure 2, the arms $i, j$ are moved by an electro-magnet $l$ energized by a circuit including a control arm $m$ movable in a gate plate $n$. This arm when brought to the end of any one of the channels in the plate $n$ closes a corresponding circuit or circuits including the electromagnet or electromagnets of one or more of the brake devices so that any of the brakes, as required to give different velocity ratios, can be applied by exerting only so much effort as is required to operate the switch arm *m*, and when applied will be maintained in operation by the arms *i*, *j*.

A switch *o* operated by a pedal *p* is provided to control all the circuits so that by depressing this pedal all the circuits are broken to liberate the brakes irrespectively of which of them is in operation at the time. For this purpose the circuits through all the electromagnets of which only one is shown in the drawing, are brought to one pole of this switch.

A spring *q* is provided to raise the core *r* of the electromagnet and to release the arms *i*, *j* from their locked position.

The control of the brake is effected by minimum expenditure of electric current, the operative position of the brake being ensured by the toggle arms or cam. Also for the same reason, when the electrical control is omitted and the toggle arms or their equivalent are moved directly or by mechanical connection to a hand lever, the usual devices for locking the said lever in its gate plate can be dispensed with.

What I claim is:—

1. Brake mechanism comprising a brake drum, a brake band around the drum, a fixed anchorage for one end of the band, a pivoted brake operating member, a spring connecting the other end of the band to the said operating member, an electromagnetically operated device for moving the operating member to and locking same in a position to hold the brake band operative, and means for unlocking the operating member and moving same to release the brake band from the drum.

2. Brake mechanism comprising a brake drum, a brake band, a pivoted brake operating member connected to the said band, arms pivoted together to form a toggle, one arm being pivoted to a fixed support and the other arm being pivoted to the brake operating member, an electromagnet operating through the pivotal joint between the said arms to move the operating member and hold the brake band in its operative position, and a spring acting on the said pivotal joint to release the toggle and brake band.

3. Brake mechanism comprising a brake drum, a brake band wound spirally more than one complete lap around the drum, a fixed anchorage for the leading end of the said band with respect to the direction of rotation of the drum, a pivoted brake operating member connected to the other end of the brake band, an electromagnetically operated device for moving the operating member to and locking the same in a position to hold the brake band operative, and means for unlocking the operating member and moving the same to release the brake band from the drum.

EDGAR JOSEPH de NORMANVILLE.

Witnesses:
JOHN T. KNOWLES,
HERBERT A. BEESTON.